United States Patent

[11] 3,573,388

[72] Inventor Clarence H. Dagnall, Jr
Westerville, Ohio
[21] Appl. No. 839,215
[22] Filed July 7, 1969
[45] Patented Apr. 6, 1971
[73] Assignee Bell Telephone Laboratories, Incorporated
Murray Hill, N.J.

[54] MARKER CONTROLLED ELECTRONIC CROSSPOINT
11 Claims, 5 Drawing Figs.

[52] U.S. Cl. .......... 179/18, 340/166
[51] Int. Cl. .......... H04q 3/42
[50] Field of Search .......... 179/18 (GF); 340/166

[56] References Cited
UNITED STATES PATENTS
3,319,009 5/1967 Regnier et al. .......... 179/18(.7YA)

*Primary Examiner*—William C. Cooper
*Assistant Examiner*—William A. Helvestine
*Attorneys*—R. J. Guenther and James Warren Falk

ABSTRACT: An electronic crosspoint matrix is arranged to operate in parallel with or as a substitute for a crossbar switch in a common control switching system. Each electronic crosspoint, which consists of an output gate controlled by a plurality of other gates, can be operated, held and released in the same manner as a conventional metallic crosspoint. High frequency data is switched through each crosspoint in response to a marking signal received on an associated select lead followed by receipt of a marking signal on an associated hold lead. Once operated, a crosspoint remains operated under control of the associated hold lead.

INVENTOR
C. H. DAGNALL, JR.
BY David H. Wirsenbaum
ATTORNEY

"NAND" GATE CROSSPOINT
2XP09-T

"NOR" GATE CROSSPOINT

MARKER CONTROLLED ELECTRONIC CROSSPOINT

BACKGROUND OF THE INVENTION

This invention relates to common control switching systems and more particularly to an electronic crosspoint switch for use in such systems.

DESCRIPTION OF THE PRIOR ART

Recent improvements in telephone communication techniques has made necessary the transmission of data at extremely high frequencies. One way to handle such high frequency transmission is to convert the transmitted information into digital data bits and to utilize existing telephone switching facilities for interconnection purposes. Under such an arrangement, the economies and flexibilities inherent in established crossbar switching networks may be extended to high frequency connections.

In addition, on certain types of connections, such as pPICTUREPHONE connections, separate linkages for the audio and for the video must be established through each switching office under direction of the common control switching equipment at that orifice. For example, in crossbar switching offices a marker establishes a connection through a crossbar switch crosspoint by providing a marking signal on one out of a plurality of select leads and on one out of a plurality of hold leads. On a connection involving video transmission, these marking signals may be extended to a parallel or slave crossbar switch thereby enabling a PICTUREPHONE connection to be established in the same manner as a conventional telephone connection.

It has been found, however, that at high frequencies (such as are necessary on video connections), distortions caused by reflections from the mechanical crosspoint contact stubs will occur in the transmitted data. Therefore, while the utilization of existing common control crossbar switching facilities is advantageous from the standpoint of economy and flexibility, the distortions which may be caused by such mechanical systems impose severe operating restrictions on high speed data communications.

Accordingly, a need exists in the art for a crosspoint switch which is capable of switching high speed data and which may be substituted directly into existing electromechanical switching systems in parallel with or as a substitute for the crossbar switch crosspoint contact.

SUMMARY OF THE INVENTION

In one embodiment of the invention, a plurality of electronic gates are arranged to form an electronic crosspoint switch such that switch such that when the proper sequence of standard crossbar network control logic (the enabling of a select magnet followed by the enabling of a hold magnet) is applied to the crosspoint, digital data will pass through the switch. Each of the crosspoints is divided into two sections; one section is associated with the select (SL) input and the other section is associated with the hold (H) input. Each section consists of an output gate controlled by either of two input gates, one of which input gates is arranged to work in conjunction with the associated input lead for primary control of the output gate. The other input gate of each section is arranged in a memory feedback manner to work in conjunction with the associated input lead to maintain an enabled (high) output gate of that section in the high condition, regardless of the condition of the associated primary control gate.

The two sections are arranged such that the output of the SL section must be high before the primary control gate of the H section will function. However, the primary control gate of the SL section is coupled to the H input lead such that when the H lead is high, the SL primary control gate is blocked. Accordingly, if a signal is received on the H lead prior to the receipt of a signal on the SL lead, the SL gate section blocks thereby blocking the H gate section. When the marking signals appear on the input leads in the proper sequence, the SL section opens and is maintained open by its memory feedback input gate. The H section thereupon opens, under control of the signal of the H lead, thereby enabling an output control gate which in turn allows data to pass through the crosspoint. Once enabled, the crosspoint remains enabled under control of the marking signal on the H input lead.

In accordance with one feature of the invention, an electronic crosspoint switch is arranged to switch data through an output gate under control of signals applied in predetermined sequence on each of two input leads.

In accordance with another feature of the invention, an electromechanical common control switching system is arranged with a marker for enabling connections through an electronic crosspoint matrix, which matrix is arranged to operate upon the enabling of a select lead followed by the enabling of a hold lead and to remain operated under exclusive control of the enabled hold lead.

In accordance with still another feature of the invention, an electronic gate crosspoint switch is arranged to function as an equivalent to a mechanical crosspoint on connections involving high speed data in crossbar switching systems.

DESCRIPTION OF THE DRAWING

The foregoing objects, features and advantages, as well as others of the invention, will be more apparent from the following description of the drawing in which: switching

DETAILED DESCRIPTION OF THE PRIOR ART

Figure 1:
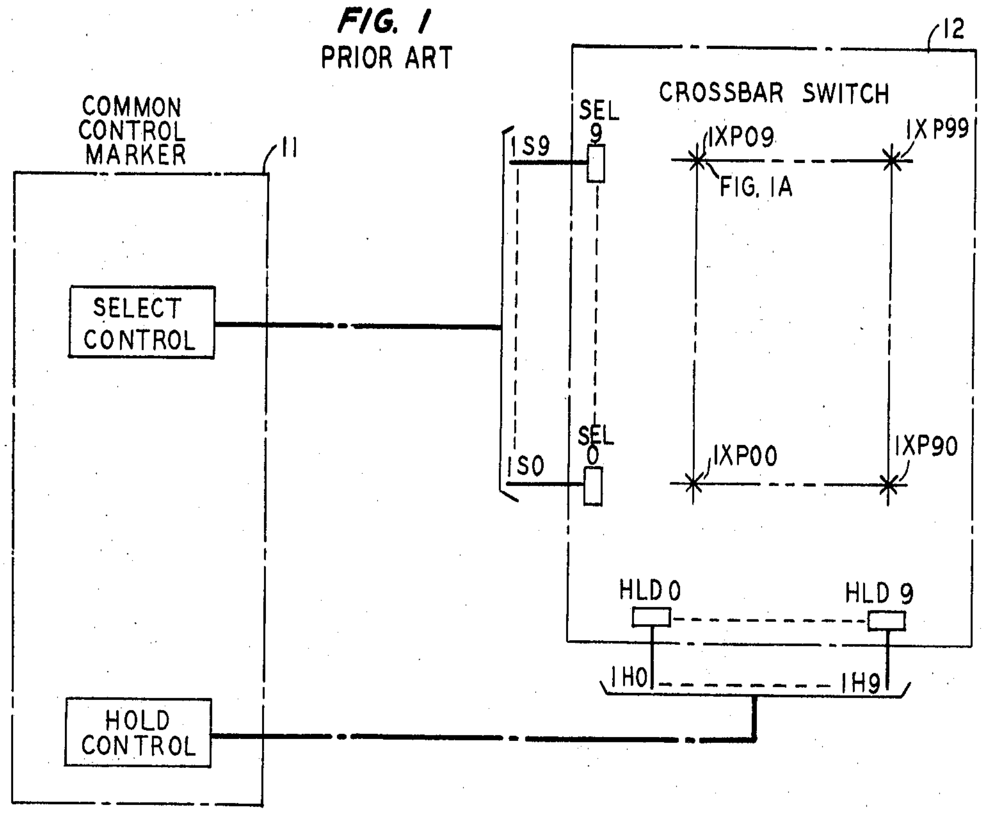
FIG. 1 PRIOR ART
FIG. 1 is essentially a block diagram of the prior art showing the interrelation of the control circuitry and a crossbar switch in an electromechanical common control switching system.

Referring now to FIG. 1, common control marker 11 is arranged in the well-known manner, as fully described in the A. J. Busch, U.S. Pat. No. 2,585,904, issued Feb. 19, 1952, to selectively enable connections through crossbar switch 12. For example, assume that it is desired to enable a connection through crosspoint 1XP09. Under these conditions, battery (or ground) is applied by common control marker 11 to select lead1S9 followed by the application of battery to hold lead 1HO. Accordingly, select magnet SEL9 in crossbar switch 12 closes, followed by the closure of hold magnet HLDO thereby enabling the selected crosspoint 1XP09. The marking signal may now be removed from select lead 1S9 and the enabled crosspoint will remain operated under exclusive control of hold lead 1HO.

The crossbar switch is mechanically arranged such that connections through the switch can only be enabled when a select magnet is operated prior to the operation of the desired hold magnet. The purpose for this sequential operation requirement will be more fully appreciated from the following illustration. Assume that crosspoint contact 1XP09 is enabled and maintained in that condition by continuously enabled hold magnet HLDO and further assume that select magnet SEL9 has been released. Also assume that it is now desired to operate crosspoint 1XP90. Accordingly, select magnet SELO is enabled from battery on select lead 1SO. Since select magnet SELO and hold magnet HLDO are both now operated, crosspoint 1XPOO, which shares the same vertical multiple with the previously operated crosspoint 1XP09, would now be enabled if the switch were not mechanically arranged for predetermined sequential operation. In this example, because hold magnet HLDO had been operated prior to the operation of select magnet SELO, the 1XP00 crosspoint is not enabled at this time, thereby preventing a second connection to the same vertical multiple.

Operation of hold magnet HLD9, from battery on hold lead 1H9, enables crosspoint contact 1XP90 at this time since select magnet SELO had been operated prior to the operation of hold magnet HLD9. Accordingly, it is necessary that any electronic crosspoint matrix which is to be substituted directly for, or arranged to work in parallel with, a mechanical crossbar switch be electrically arranged to function only when marking signals are applied in predetermined sequential order so that double connections are not established through the matrix.

Figure 1A:
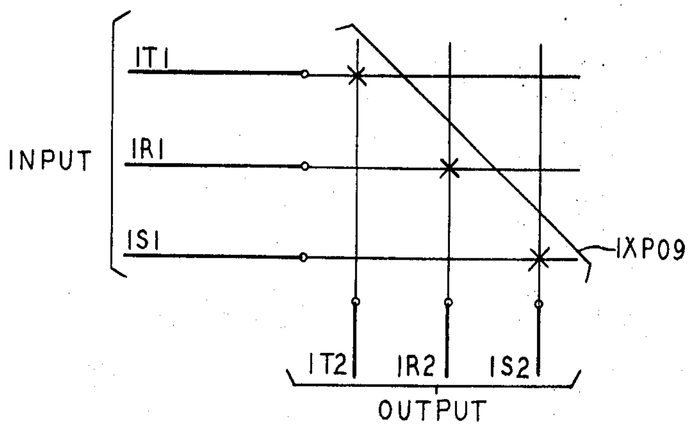
FIG. 1A PRIOR ART
FIG. 1A is a schematic drawing showing in greater detail one crosspoint of the prior art crossbar switch.

Turning now to FIG. 1A, crosspoint 1XP09, which is typical of all crosspoints in crossbar switch 12, is illustrated in more detail. It will be seen that each crosspoint consists of a group of input horizontals 1T1, 1R1 and 1S1 and a group of output verticles 1T2, 1R2 and 1S2. As well known in the prior art, upon contact closure each vertical multiple is mechanically connected to the corresponding horizontal multiple as shown by the "X," such that signals appearing on an input lead are transmitted through the closed contact to the corresponding output lead.

DETAILED DESCRIPTION OF THE INVENTION

Figure 2:
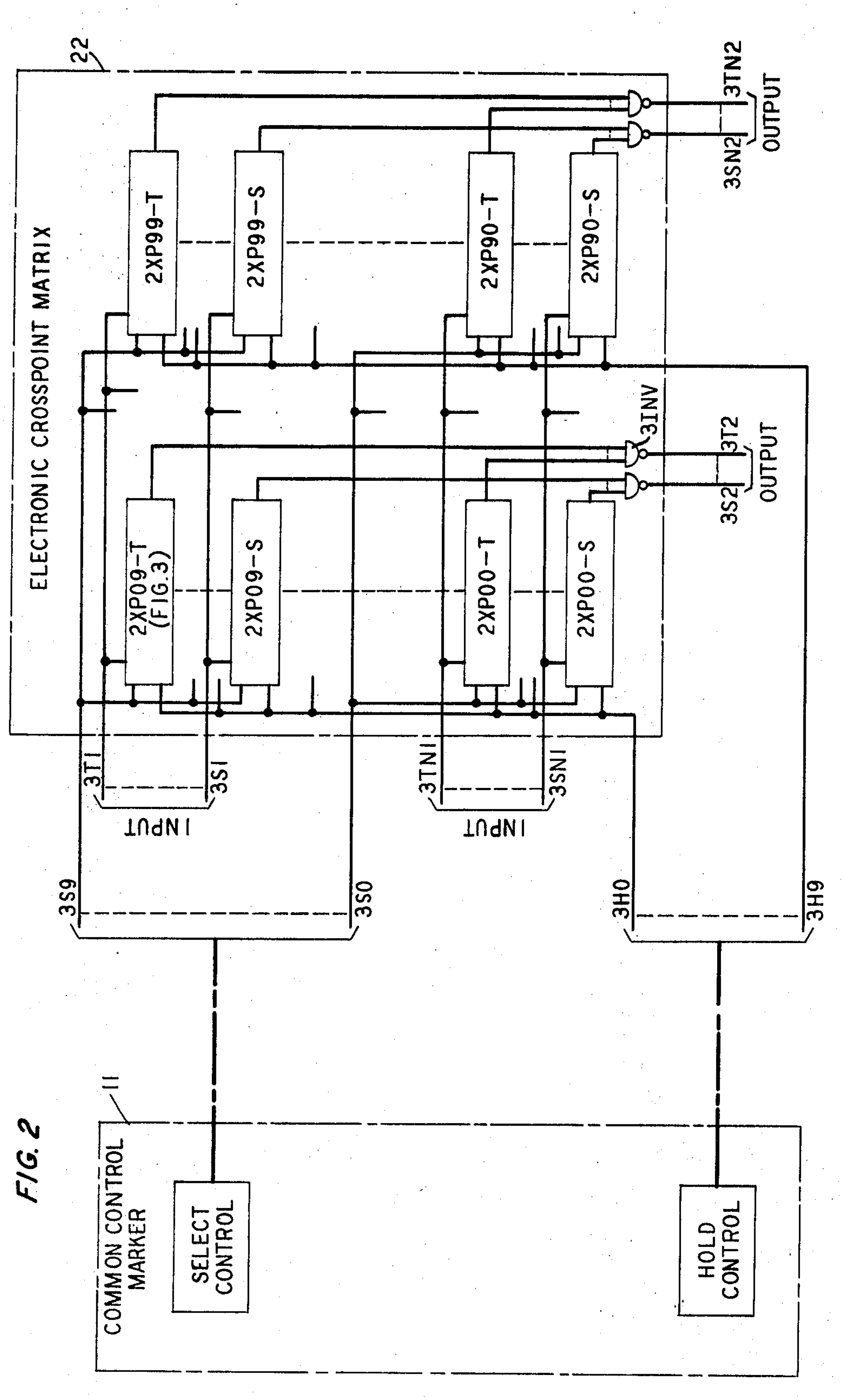
FIG. 2 is essentially a block diagram showing the interrelation of the exemplary embodiment of the invention.

Referring now to FIG. 2, a group of individual electronic crosspoint switches, 2XP00 through 2XP99, are arranged to form an electronic crosspoint matrix 22 for direct substitution into an existing common control switching network. Accordingly, electronic crosspoint matrix 22 may either be substituted for crossbar switch 12, as shown, or may be slaved therewith to work in parallel with crossbar switch 12 (provided a suitable voltage buffer, such as a dry reed relay, is placed in the control leads) on connections involving dual linkages.

Marker 11 functions as previously discussed such that crosspoint 2XP00, in the manner to be more fully detailed hereinafter, is enabled upon the application of battery on select lead 3S0 followed by the application of battery on hold lead 3H0, while crosspoint 2XP09 is enabled from battery on select lead 3S9 followed by the application of battery on hold lead 3H0. Each crosspoint is arranged to provide a signal path only when marking signals have been received on the respective select and hold leads in the proper predetermined sequence. Upon the enabling of an electronic crosspoint, the marking signal on the hold lead maintains exclusive control of that crosspoint.

NAND GATE CROSSPOINT

Figure 3:
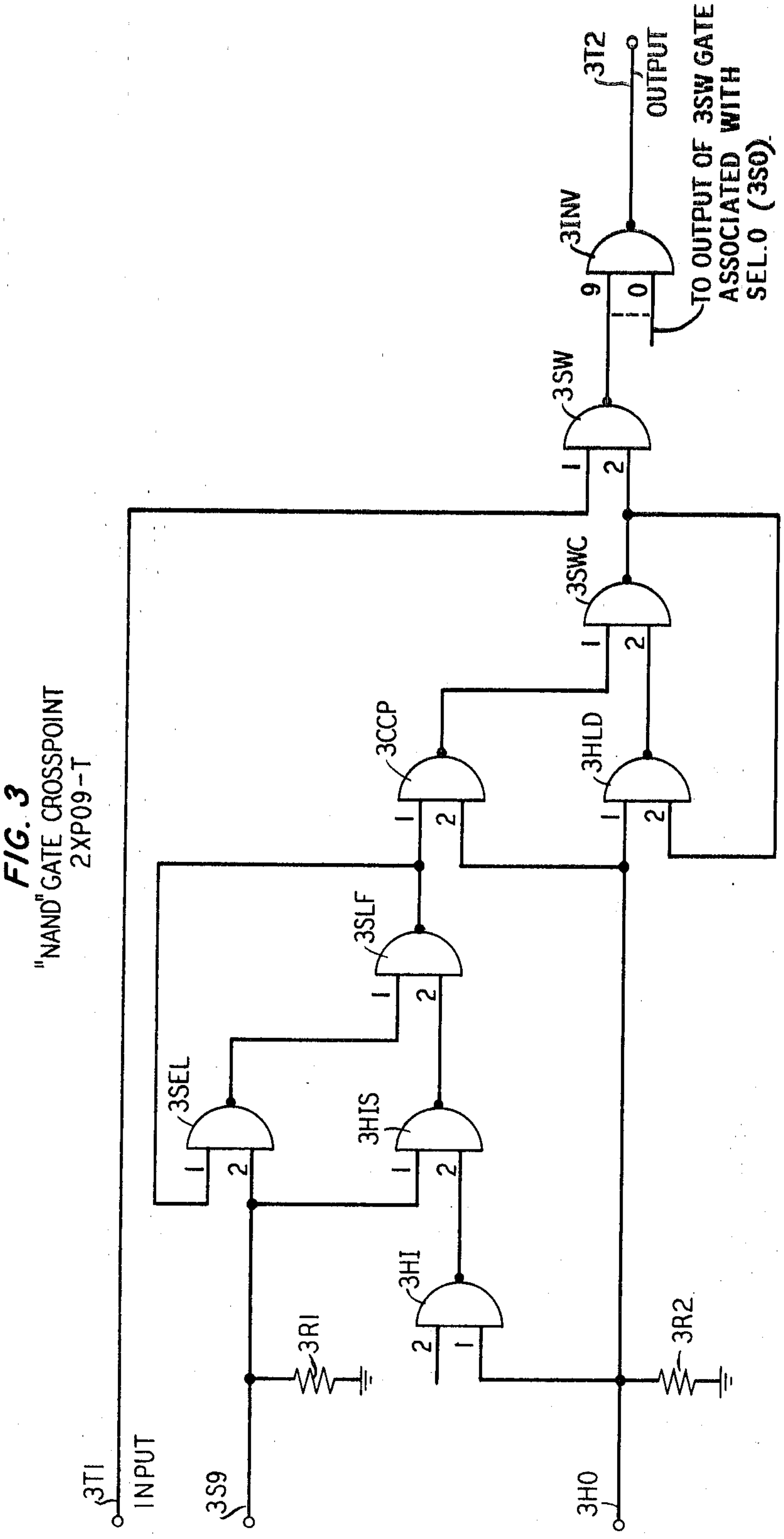
FIG. 3 is a schematic drawing showing in greater detail the interrelation of the components of an exemplary embodiment of the invention.

Turning now to FIG. 3, crosspoint 2XP09-T, which is typical of all crosspoints of electronic crosspoint matrix 22, is illustrated in detail. Input lead 3T1 represents one associated horizontal multiple while output lead 3T2 corresponds with the associated vertical multiple such that when the crosspoint is enabled, signals appearing on input lead 3T1 will appear on output lead 3T2 under control of output gate 3SW and inversion gate 3INV. Although only the T horizontal multiple is shown, it should be understood that each crosspoint consists of a number of identical electronic gate circuits, each associated with an individual R or S multiple.

Digressing momentarily, it should be noted that each electronic gate, such as gate 3SW, is arranged in any one of the well-known circuit configurations such that when a battery potential (high) is present on both inputs, the output will be ground (low). If either input is low, the output will be high. Such a gate is known as a NAND gate. Unused inputs of any NAND gate will be assumed to be high. These gates are used to perform a simple inversion, thereby providing the inverse of the signal applied to the input.

Returning now to FIG. 3, let us assume that signals are absent from input leads 3S9 and 3H0. Accordingly, ground, via resistor 3R1, is present on input 2 of gate 3SEL and on input 1 of gate 3HIS. At the same time ground, via resistor 3R2, is present on inputs 1 of gates 3HI and 3HLD and on input 2 of gate 3CCP. Since at least one of the inputs of gates 3CCP and 3HLD are low, both inputs of gate 3SWC will be high, causing the output of gate 3SWC to be low. Under these conditions (assuming that the outputs of the other 3SWC gates associated with the same vertical multiple are also high) signals on input 3T1 are blocked by output gate 3SW thereby maintaining output 3T2 low. Therefore, with respect to signals on lead 3T1, electronic crosspoint 2XP09 appears open.

For purposes of illustration, let us assume now that a battery is received on hold lead 3HO followed by battery on select lead 3S9. Since these signals have not been received in the proper sequence, the crosspoint will not be enabled at this time. An analysis of the circuit will now be undertaken to demonstrate that the output lead 3T2 remains unchanged regardless of the signals on input lead 3T1.

As set forth previously, the output of gate 3SW will remain high as long as either input remains low. Accordingly, the output of gate 3SWC must first go high before the crosspoint will function. However, the output of gate 3SWC is connected to input 2 of gate 3HLD in a memory feedback manner such that as long as the output of gate 3SWC is low, the output of gate 3HLD will be high. Accordingly, gate 3SWC is controllable at this time only by gate 3CCP, the output of which will remain high as long as either of its inputs is low. Input 1 of gate 3CCP will be low if both inputs to gate 3SLF are high. Input 2 of gate 3SLF is now high since the battery (high) from hold input lead 3HO is inverted by gate 3HI and applied to input 2 of gate 3HIS as a low.

Prior to the receipt of battery on select lead 3S9, input 2 of gate 3SEL and input 1 of gate 3HIS were both low thereby making the output of gate 3SLF low. The output of gate 3SLF is arranged in a memory feedback manner with input 1 of gate 3SEL so as to maintain the output of gate 3SEL high. Accordingly, when the battery (high) signal is received on select lead 3S9, the output of gate 3SEL remains high. However, since the output of gate 3HIS also remains high at this time because of the low on input 2 from gate 3HI, the output of gate 3SLF remains low at this time, thereby maintaining the output of gate 3CCP high. Accordingly, the output of gate 3SWC is maintained low, thereby maintaining output lead 3T2 low regardless of the condition of input lead 3T1.

Now let us assume that the marking signals appear on the control leads in proper sequence such that battery is present on input lead 3S9 prior to the receipt of battery on input lead 3HO. Accordingly, the high on input 1 of gate 3HIS coupled with the high on input 2 (since input lead 3HO remains low for some time after input 3S9 is high) causes the output of gate 3HIS to go low and the output of gate 3SLF to go high. This high is returned to gate 3SEL and coupled with the high from select lead 3S9 to maintain the output of gate 3SLF high under control of the input lead 3S9 without regard to the status of the inverse hold signal on input 2 of gate 3HIS. Accordingly, the receipt of high on input 2 of gate 3CCP, from the battery on hold lead 3HO, coupled with the high on input 1 of gate 3CCP from the output of gate 3SLF causes the output of gate 3CCP to become low thereby switching the output of gate 3SWC from a low to a high condition. Input 2 of output gate 3SW going high allows the signals which are received on lead 3T1 to control the output gate such that a high signal on input lead 3T1 causes the output lead 3T2 to go high. Accordingly, with respect to input lead 3T1, crosspoint 2XP09 is now enabled and signals on the input horizontal 3T1 will appear on the output vertical 3T2.

It will be noted that a high from hold lead 3HO and a high from the output of gate 3SWC is on each input of memory feedback gate 3HLD. Accordingly, gate 3SWC is now under exclusive control of the memory feedback gate 3HLD as long as marking battery remains on hold input lead 3HO. Under these conditions, the removal of battery from the select lead 3S9 will have no effect on the output, and the crosspoint will remain operated under exclusive control of the enabled hold lead.

Summarizing briefly, a plurality of electronic gates are arranged in two sections to form an electronic crosspoint with each section containing three gates; a primary gate (3HIS, 3CCP), a feedback memory gate (3SEL, 3HLD), and an output gate (3SLF, 3SWC). Each section is connected to a respective one of the input leads 3S9 and 3H0 such that a battery on the 3S9 lead followed by a battery on the 3HO lead enables an output signal control gate (3SW), thereby closing the crosspoint to data signals from input lead 3T1. The inverse of the signal on the 3HO lead is applied to the gate section associated with the 3S9 lead so as to prevent the enabling of the crosspoint when the enabling signals do not arrive in the proper predetermined sequence.

ALTERNATE CROSSPOINT ARRANGEMENT

Figure 4:
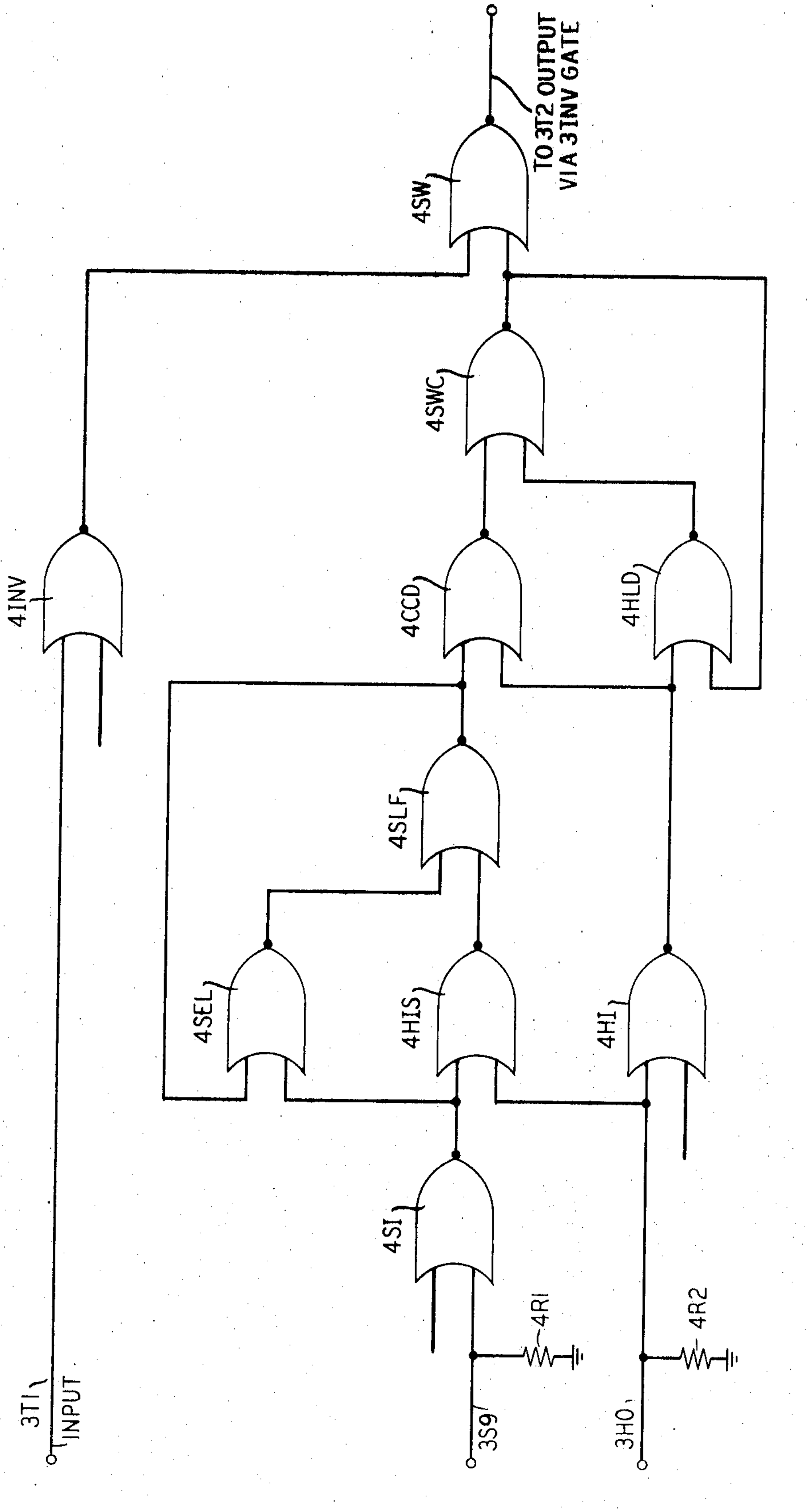
FIG. 4 is a schematic drawing showing an alternate embodiment of the invention.

Turning now to FIG. 4, an electronic crosspoint is shown utilizing NOR gates instead of NAND gates. Each gate is arranged in any one of well-known circuit configurations such that the output of the gate will be high when both inputs are low. This embodiment functions in a similar manner to the NAND crosspoint gate circuit such that signals applied to the input 3T1 will be inverted by gate 4INV and applied to one input of an output gate 4SW. Only when a low is provided to the second input of output gate 4SW by gate 4SWC will the output lead 3T2 follow the signals applied on input lead 3T1. Comparision between the NOR gate crosspoint shown in FIG. 4 and the NAND gate crosspoint shown in FIG. 3 will reveal only minor distinctions between the circuit arrangements; namely, the placement of the inversion gates 4S1, 4HI and 4INV, which gates are necessitated by the reversal in the logic between NAND and NOR gate circuits. Both circuit configurations comprise two gate sections coupled to an output gate and arranged such that the output gate is enabled only in response to battery signals received on the select input lead 3S9 followed by the receipt of battery signals on the hold lead 3HO. Once enabled, the NOR gate crosspoint is maintained in that condition exclusively by battery signals on the hold lead.

CONCLUSION

While the equipment of this invention has been shown in a particular embodiment wherein an electronic switch is arranged with a plurality of electronic logic gates to control digital signals through an enabled output gate, it is understood that such an embodiment is intended only to be illustrative of the present invention and numerous other arrangements may be devised by those skilled in the art without departing from the spirit and scope of the invention.

For example, this invention can be used to control continuous analogue signals, having both high and low frequency components, through a special analogue gate controlled by the digital logic from an enabled electronic crosspoint switch.

As a further example, this invention could be used for protection switching of a digital carrier system. Under such an arrangement, the data streams could be switched from one modulator to another in accordance with the most desirable radio spectrum.

I claim:

1. An electronic crosspoint for use in a switching system wherein connections are selectively enabled through a crosspoint in response to marking signals on an associated select lead and on an associated hold lead, wherein said electronic crosspoint comprises:
   - an output gate for controlling data through said electronic crosspoint;
   - electronic gate means responsive to the application of said marking signals on said select lead and on said hold lead for enabling said output gate; and
   - means for inhibiting said enabling of said output gate when said hold signal is applied to said electronic gate means prior to said application of said select signal.

2. The invention set forth in claim 1, further comprising means exclusively controlled by said hold lead marking signal for maintaining said enabled output gate in said enabled condition.

3. The invention set forth in claim 2, wherein said electronic gate means comprises:
   - a plurality of NAND gates each having an output controlled by two inputs and wherein:
     - said inhibiting means includes means for generating a signal inverse to said hold lead marking signal and for comparing said inverse signal to said select lead marking signal.

4. The invention set forth in claim 2, wherein said electronic gate means comprises:
   - a plurality of NOR gates each having an output controlled by two inputs and wherein:
     - said inhibiting means includes means for generating a signal inverse to said select lead marking signal and for comparing said inverse signal to said hold lead marking signal.

5. An electronic crosspoint matrix for use in a common control switching system wherein connections may be enabled between a selected vertical multiple and a selected horizontal multiple through a crossbar switch in response to marking signals on one out of a plurality of select leads and on one out of a plurality of hold leads, said matrix operating in parallel with or as a substitute for said crossbar switch and including a plurality of electronic crosspoints, each said crosspoint comprising:
   - an output gate for controlling data through said crosspoint;
   - electronic gate means responsive to the receipt of said marking signals on an associated select lead and on an associated hold lead for enabling said output gate;
   - means controlled exclusively by said hold lead marking signal for maintaining an enabled output gate in said enabled condition; and
   - means for inhibiting said enabling of said output gate when said hold signal is received by said electronic gate means prior to said receipt of said select signal by said electronic gate means.

6. The invention set forth in claim 5, wherein said output gate includes:
   - a first input connected to an associated horizontal multiple;
   - a second input connected to said electronic gate means;
   - an output connected to an associated vertical multiple; and
   - means jointly responsive to an enabling signal on said second input from said electronic gate means and to an enabling signal on said first input from said horizontal multiple for repeating said horizontal multiple signal on said associated vertical multiple.

7. A telephone switching system crosspoint comprising:
   - an output gate for selectively controlling data through the crosspoint;
   - a select input and a hold input for receiving enabling signals;
   - a plurality of electronic gates each having a first and a second input and a single output, said gates being arranged in a first and a second group, each of said groups having a primary gate, a memory gate, and a control gate, and wherein each of said groups includes:
     - a connection between said output of said primary gate and said first input of said control gate;
     - a connection between said output of said memory gate and said second input of said control gate; and
     - a connection between said output of said control gate and said first input of said memory gate;
     - said select input connected to said second input of said memory gate and connected to said first input of said primary gate in said first group of gates;
     - said hold input connected to said second input of said primary gate in said first group of gates and connected to said second input of said primary gate and to said first input of said memory gate in said second group of gates; and
     - interconnecting means between said first and said second groups of said gates and between said second group of said gates and said selectively controllable output gate, whereby said output gate is enabled in response to the receipt of an enabling signal on said select input followed by the receipt of an enabling signal on said hold input and said output gate is inhibited when said enabling signals are received in reverse order.

8. The invention set forth in claim 7, wherein said electronic gates comprise a plurality of NAND gates and wherein said inhibiting means includes means for inverting said hold input signal and for comparing said select signal to said inverting signal.

9. The invention set forth in claim 8, further comprising means for maintaining an enabled output gate in said enabled condition under exclusive control of said hold input signal.

10. The invention set forth in claim 7, wherein said electronic gates comprise a plurality of NOR gates and wherein said inhibiting means includes means for inverting said select input signal and for comparing said inverted select signal to said hold input signal.

11. The invention set forth in claim 10, wherein said enabling means includes means for inverting said hold input signal; and means for maintaining the enabled output gate in said enabled condition under exclusive control of said inverted hold input signal.